Jan. 7, 1958
B. SCHWARZ
2,819,440
INDUCTION REGULATOR CONTROL FOR A. C. COMMUTATOR MACHINES
Filed Dec. 13, 1954
2 Sheets-Sheet 1
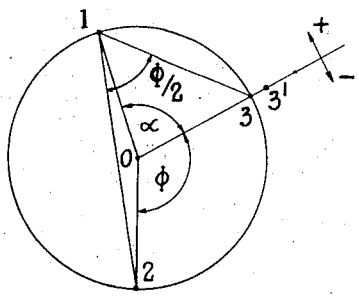
FIG.I.
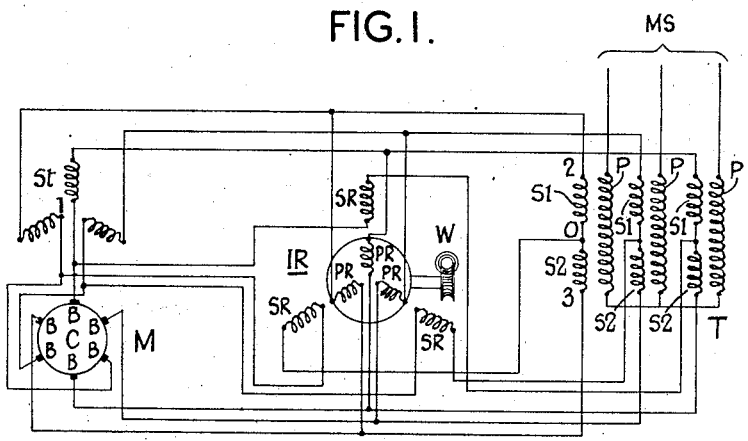
FIG.2.
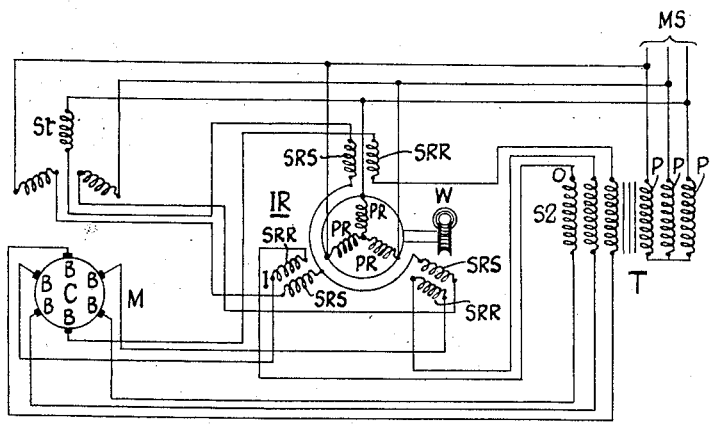
FIG.3.
INVENTOR
BENNO SCHWARZ
BY

INVENTOR
BENNO SCHWARZ

United States Patent Office 2,819,440
Patented Jan. 7, 1958

2,819,440

INDUCTION REGULATOR CONTROL FOR A. C. COMMUTATOR MACHINES

Benno Schwarz, Norwich, England

Application December 13, 1954, Serial No. 474,767

Claims priority, application Great Britain December 17, 1953

6 Claims. (Cl. 318—244)

The invention is concerned with the speed and voltage control of stator fed shunt A. C. commutator machines, i. e. commutator motors and self-propelling frequency converters.

As is well-known the speed adjustment of such machines is based on the principle that an A. C. voltage at supply frequency is applied to the commutator brushes, such voltage having essentially the same vectorial position as the rotor voltage at these brushes, so that these voltages can balance each other at the required speed of the machine.

Whilst arrangements have become known in which the coincidence of vectorial position of the applied voltage and the rotor voltage at the brushes has been obtained by adjusting the brush position, it is desirable for practical operational reasons to keep the brushes in a fixed position. From this it has been concluded that the voltage applied to the commutator brushes for the purpose of speed adjustment of the machine must have a fixed phase position.

Special arrangements had to be used in order to obtain a regulating voltage of fixed phase position in the rotor circuit with induction regulators which because of their stepless voltage variation not requiring, moreover, any switching operation, have been generally preferred to the originally used tapped transformers.

The single induction regulator which obviously is the simplest and, therefore, from the economical and operational point of view most desirable design, produces in its basic form a voltage of constant magnitude and variable phase position and is, therefore, as such, not usable for the purpose.

The solutions utilised and developed for the rotor voltage regulation of shunt commutator motors fall briefly into two categories, the double induction regulator and special single induction regulators with series connected primary windings distributed in stator and rotor, both of which allow a variable voltage of fixed phase position to be obtained.

The present invention is based on a different approach to the problem outlined above.

According to the present invention in a regulating system for a stator-fed shunt A. C. commutator machine having fixed commutator brushes, the coincidence of phase position of the commutator voltage at the fixed brushes, and of the applied regulating voltage is obtained by the simultaneous introduction into the stator and rotor circuits of the machine, of a secondary voltage of fixed magnitude and variable phase position, obtained from a single induction regulator so as to obtain a fixed phase angle between the voltage applied to the stator winding and the voltage applied to the commutator brushes, both voltages changing their vectorial position simultaneously at different positions of adjustment of the regulator.

It will be realised that the principle on which the invention is based is basically different from the principle of the known arrangements.

As explained above, in the known arrangements the phase position of the commutator voltage at the fixed brushes remains constant as the phase position of the voltage applied to the stator winding is constant.

With the new arrangement the phase position of the voltage applied to the stator winding is changing simultaneously with the voltage applied to the brushes.

As the rotor voltage at the fixed brushes changes in phase in unison with the applied stator voltage the correct operational conditions can be obtained if the applied voltage to the brushes changes its phase position by the same angle.

It is then only necessary to adjust the brushes to a fixed position in accordance with the angle between the rotor voltage at the brushes and the voltage applied to the brushes in order to obtain as required for the correct operation of the machine, coincidence of phase position for all regulator and speed adjustments between the two voltages.

In order to execute the principle of the invention, i. e. to obtain a constant phase angle between the applied stator voltage determining the phase position of the rotor voltage on one hand, and the voltage applied to the brushes on the other hand, these voltages are obtained through the vectorial addition of a fixed voltage and of the secondary voltage of an induction regulator which also has a fixed voltage, but of varying phase angle.

In accordance with that principle it is, moreover, necessay that the respective fixed voltages in both circuits are substantially equal to the secondary voltage of the induction regulator but the relative phase position of these fixed voltages can be freely chosen to suit individual design considerations.

Diagrams illustrative of the principle of the invention, and modes of carrying it out are shown in the accompanying drawings, in which:

Figure 1 is a vector diagram illustrative of the principle of the invention.

Figure 2 is a circuit diagram illustrating, by way of example, one arrangement in accordance with the invention.

Figure 3 is a circuit diagram illustrating another example.

Figure 5a illustrates diagrammatically an arrangement having three star-connected phases instead of three open phases in the rotor circuit, thereby to reduce the number of flexible connections that would otherwise be necessary, and Figure 5b is a modification of Figure 5a.

Figure 4:
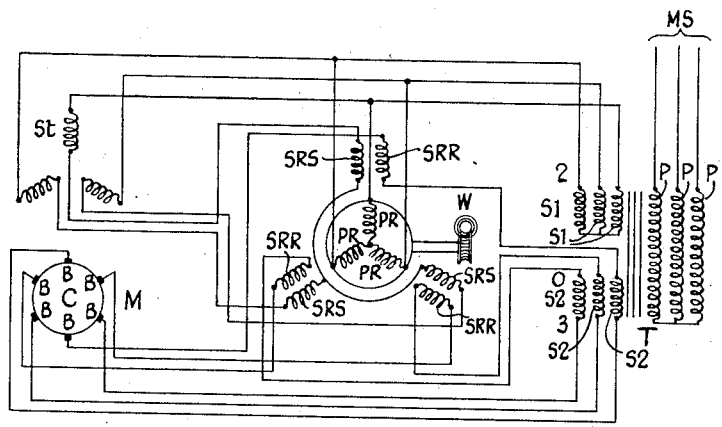
Figure 4 is a circuit diagram illustrating a further example embodying features of the arrangements in Figures 2 and 3 in combination.

In the accompanying drawings the vector diagram, Figure 1, illustrates the outlined principle.

In this vector diagram 0,2 represents vectorially a fixed voltage introduced into the stator circuit, and 0,3 a fixed voltage introduced into the rotor circuit, these voltages being equal and enclosing the angle $\phi$.

0,1 represents vectorially the secondary voltage of an induction regulator, this voltage being equal to 0,2 and 0,3 and the locus of its vector end being the circle having the centre 0 shown in the vector diagram (Figure 1).

For any angle $\alpha$ i. e. for any adjustment of the induction regulator, the angle enclosed by the voltage vectors 2,1 and 3,1 is constant and equals $$\frac{\phi}{2}$$

as the angle subtended by a chord at the centre of a circle is twice the angle subtended at the circumference.

In applying the voltage 2,1 to the stator winding of a shunt commutator machine and the voltage 3,1 to the commutator brushes, the above stipulated condition that their relative phase position must remain constant over the whole range of induction regulator adjustments is fulfilled. By adjusting the brushes in accordance with $$\frac{\phi}{2}$$

i. e. so that the rotor voltage, appearing at the brushes is in phase with 3,1 correct operation as outlined above is obtained.

It will be seen that for $\alpha=0$, 3,1 becomes 0 which results in the machine operating at synchronous speed like an induction motor. Assuming that for a positive adjustment angle $\alpha$, as shown in the diagram, a sub-synchronous speed is obtained, a negative adjustment angle results in a hyper-synchronous speed.

The speed difference between the actual and the synchronous speed apart from the effect of impedance voltage drops is proportional to $$\frac{3,1}{2,1}$$

As the voltage applied to the stator winding is variable, the machine operates with different amounts of magnetic flux at different speed adjustments which can be utilised to improve the performance of commutator motors applied to drives with different torque speed requirements.

For centrifugal pumps and fans, for instance, it is useful to reduce the flux with reducing speed of the motor, whereas for some machine tools requiring constant output, it is useful to reduce the flux with increasing speed of the motor.

In many cases it is advantageous to reduce the flux with increasing deviation of the actual speed from the synchronous speed, in order to reduce the transformer voltage between adjacent bars, i. e. the voltage induced by the rotating field in the commutating turns short circuited by the brushes, to facilitate the commutating conditions and thereby to make possible more economical designs.

The arrangement chosen for an actual case allows adjustment of all relevant design quantities by the choice of the angle $\phi$ and by the choice of the turn ratio between rotor and stator winding.

The choice of $\phi=180°$, for instance, results in the maximum flux being obtained at synchronous speed of the motor. With $\phi$ smaller than 180° the maximum flux occurs at the sub-synchronous speed, and with $\phi$ bigger than 180° the maximum flux occurs at the hyper-synchronous speed.

In all cases a regulator adjustment giving 3,1=2,1 referred to a turn ratio equal to one between stator and rotor winding, results in the motor remaining at standstill, as in this condition the secondary voltage applied to the commutator brushes and the rotor voltage balance each other.

The motors can, therefore, with the arrangement according to the invention, be started from standstill with the minimum commutator voltage and current consistent with the required starting torque, i. e. with the best commutating conditions.

This even refers to such cases where in the speed range proper the flux is being reduced with increasing speed as can be readily seen from the vector diagram.

There is, therefore, no necessity with the arrangements according to the invention to provide any special means for reducing the starting current, for instance, by the introduction of resistances and the like in the rotor circuit, and/or by reduction of the applied stator voltage by similar means or by auto-transformer starting and so forth.

By changing the turn ratio between the stator and rotor windings of the commutator machine the change of flux at different adjusted speed levels can be influenced.

A low value of turn ratio results in a large reduction of flux with decreasing speed. At standstill for instance and assuming an angle $\phi=180°$ to be chosen, the standstill condition is obtained with a flux of approximately 71% of the full flux at synchronous speed with a turn ratio of 1, whereas with a turn ratio of .5, only approximately 45% of the full flux is obtained under the same condition.

Similar considerations obtain at other speed levels taking into account also the choice of $\phi$.

The system is, therefore, extremely flexible in its execution to meet varying requirements of design and application.

The principle of the invention can be executed in various ways, some of which are described in connection with the following illustrated examples.

In Figure 2, St denotes the stator winding of an A. C. commutator motor M, C the commutator and rotor winding and B the commutator brushes in contact with the commutator.

IR represents an induction regulator, the primary winding PR of which is fed from the secondary winding $S_1$ and $S_2$ of the transformer T whose primary winding P is connected to the A. C. supply MS. A worm gear W may be provided for the adjustment of the induction regulator IR.

The secondary winding SR of the induction regulator IR is connected at one end of each open phase to the connection points 0 of the two parts of the transformer secondary winding $S_1$ and $S_2$, and at the other end of each open phase to the point 1 which connects the stator and rotor circuit of the motor M.

It will be seen that by choice of a voltage of $S_1$ e. g. between the points 0 and 2, equal to the voltage of $S_2$ between the points 0 and 3 of Figure 2, these two voltages are represented by the voltage vectors 0,2 and 0,3 in the vector diagram, Figure 1, provided the phase angle between the windings $S_1$ and $S_2$ is chosen as to be equal to $\phi$.

By choosing the transformation ratio of the induction regulator IR, i. e. the turn ratio between PR and SR to be 2:1 the voltage produced by SR will be equal in magnitude to the voltages in $S_1$ and $S_2$, and the locus of its vector end 1 will move on the circle shown in Figure 1 as previously explained.

The voltages applied to the stator winding St and the commutator C of the motor M, respectively, are then represented by the vectors 2,1 and 3,1 in Figure 1.

By making one of the voltages slightly bigger or smaller than the others, a magnetising voltage component can be introduced into the rotor circuit for the purpose of power factor correction, and increase of stability and overload capacity of the machine.

The voltage $S_2$ can, for instance, be increased from 0,3 to 0,3' in Figure 1 resulting in the introduction of a compensating voltage of the magnitude 3,3', which vectorially is at right angles to the rotor voltage at synchronous speed. The effect of this compensating voltage, in view of the changing vectorial position of the voltage 3,1 applied to the commutator is reduced with increasing deviation from the synchronous speed adjustment in which range, however, an increase or decrease of the effective voltage component can be obtained through slight adjustment of the commutator brushes as referred to their "neutral" position on which the above explanations are based.

The primary winding PR of the regulator, instead of being connected as shown in Figure 2, can either be connected to $S_1$ or $S_2$ if this is convenient for the design.

It is possible also to have a transformer interposed between the circuit of the transformer and regulator and the commutator C, shown in Figure 2.

The primary winding of such transformer would then be connected in place of C in Figure 2 and the secondary winding to the brushes B of the commutator C. Such intermediate transformer would make it possible to design the windings of the transformer T, the regulator IR and the stator winding St of the motor for a voltage independent of the commutator voltage, which in its turn is limited by consideration of commutation, commutator and brush gear design.

Another example of an arrangement according to the invention is shown in Figure 3, in which the same lettering as in Figure 2 is used where applicable.

In this case the stator winding St is connected to the supply and the transformer T only contains the part $S_2$ of the secondary winding.

The induction regulator IR, however, has two secondary windings SRR and SRS which are, respectively, connected in the rotor and stator circuit of the motor M.

These two secondary windings are wound in the same slots of the secondary core of the induction regulator, for instance, in its stator.

The induction regulator primary winding PR is in Figure 3 connected to the supply, but can also be connected to $S_2$ in accordance with design considerations.

It will be clear that in the example, Figure 3, the fixed voltage (0,2 in Figure 1) introduced into the stator circuit of the motor, i. e. into the circuit of St, is the supply voltage, whereas the constant voltage (0,3) for the rotor circuit is obtained from $S_2$ in the same way as in Figure 2.

The two separate windings SRS and SRR of the regulator make it possible to design stator and rotor individually, i. e. for voltages which are best suited for the operational conditions.

Another advantage of this arrangement is that the transformer T has only to be designed for the regulator output.

It will be mostly found that the arrangement according to the Figure 3 is particularly economical for low tension supply, whereas the arrangement according to Figure 2 is more economical for high tension supply, particularly in such cases where the supply voltage is high as referred to the motor size.

Figure 4 shows an arrangement which combines some of the features of Figures 2 and 3. In this case, two unconnected secondary windings $S_1$ and $S_2$ are provided in the transformer T and two separate secondary windings SRS and SRR are provided in the induction regulator IR, resulting in two completely separate circuits for the stator and rotor of the commutator machine M.

This arrangement is again useful for high tension supply. It allows independent design of the stator and rotor winding of the commutator machine M, and also makes it possible for an independent number of phases in these two windings, as, for instance, shown in Figure 4, where the rotor circuit contains three open circuits, resulting in 6 phase feeding of the commutator, whereas the stator winding St is a 3 phase star connected winding, the same applying to the secondary winding $S_1$ of the transformer and to the primary winding PR of the regulator IR. The regulator IR is, in this example, connected to $S_1$ and star connected internally, thus reducing the number of flexible leads to three as compared with six in Figures 2 and 3, assuming the primary winding PR to be accommodated in the rotor of the induction regulator.

Figure 5:
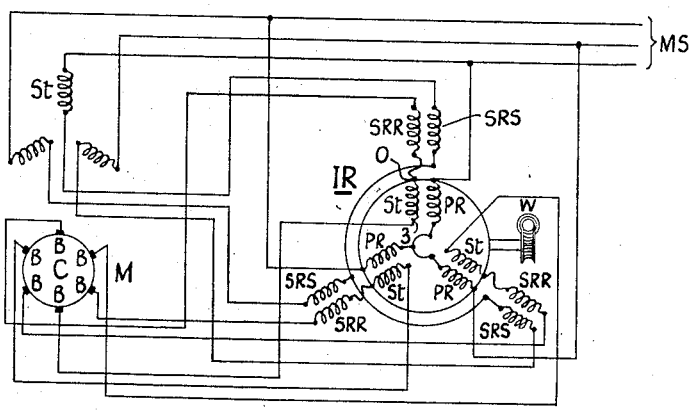
Figure 5 is a circuit diagram illustrating an arrangement in which the constant voltage is derived from a secondary winding accommodated in the induction regulator, in the same slots as those of the primary winding therefor which is connected to the supply.

In the arrangement illustrated by Figure 5, the constant voltage is derived from a secondary winding ST accommodated in the induction regulator in the same slots as those for the primary winding PR, which is connected to the supply MS.

There are two secondary windings in the induction regulator as in Figures 3 and 4 and the constant voltage for the stator circuit is the supply voltage as described in connection with Figure 3.

In view of the introduction of the additional secondary winding ST in the induction regulator in Figure 5, the transformer used in the previous examples is eliminated.

Figures 5A, 5B:
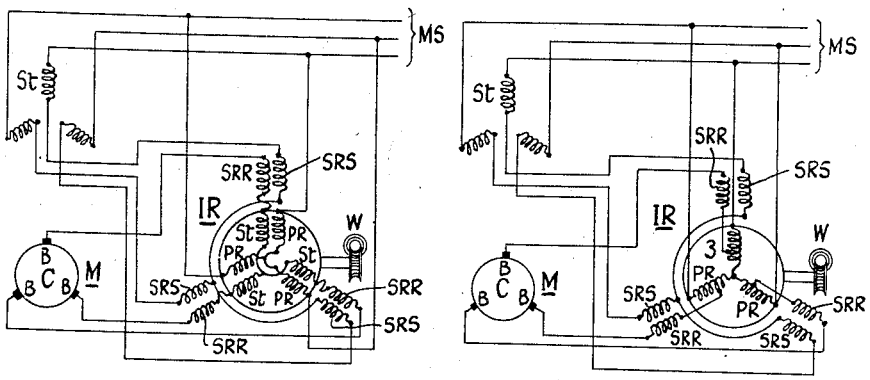

Instead of three open phases in the rotor circuit as shown in Figure 5, the rotor circuit can be arranged with three star connected phases, as shown in Figure 5a, in order to reduce the number of flexible connections required in the induction regulator.

This scheme is particularly suitable for machines of small size.

A variation of the arrangement according to the Figure 5a is shown in Figure 5b, where, instead of a separate secondary winding ST, the primary winding PR of the induction regulator IR is tapped at a suitable point for connecting with the rotor circuit, the tapping being marked 3 and the voltage of the part 03 of the winding PR being the fixed voltage 0,3 introduced in that circuit in accordance with Figure 1.

It will be understood that the execution of the invention is not limited to the examples described, and that several other arrangements are possible according to the invention, within the framework of its principle.

I claim:

1. A regulating system for a stator fed shunt A. C. commutator machine having a stator circuit including a stator winding and a rotor circuit including a rotor winding and commutator brushes of the fixed type, a source of electrical energy, said stator circuit and said rotor circuit being connected in shunt across said supply and means for introducing into said stator and rotor circuits, simultaneously, a secondary voltage of fixed magnitude and variable phase position, said means including a single induction regulator including a primary winding connected to said supply and secondary winding means, said secondary winding means of the regulator being connected, in series, with both said stator circuit and said rotor circuit, whereby the voltages supplied to said stator and rotor circuits are, respectively, the vectorial sum of the supply voltage through said stator plus the regulator secondary voltage supplied to said stator and the supply voltage through said rotor plus the regulator secondary voltage supplied to said rotor, both of said voltages changing their vectorial positions simultaneously at different positions of adjustment of said induction regulator.

2. A regulating system according to claim 1, wherein said stator and rotor circuits are connected to said supply by means of a transformer, said transformer having a secondary winding supplying both stator and rotor circuits and the windings of said induction regulator.

3. A regulating system according to claim 1, including a transformer coupling said rotor circuit and said stator circuit to said supply, said induction regulator having its secondary winding common to both the rotor and stator circuits of the motor.

4. A regulating system according to claim 3, wherein the commutator brushes are fed through an additional intermediate transformer.

5. A regulating system according to claim 1, wherein the rotor circuit is fed by a transformer and wherein the induction regulator has two secondary windings, one of which is included in the rotor circuit and the other of which is included in the stator circuit, said stator circuit being directly connected to said supply.

6. A regulating system according to claim 1, wherein a transformer is provided having separate secondary windings in the stator and rotor circuits, said induction regulator secondary means including two secondary windings, one of which is in series in the stator circuit and the other of which is in series in the rotor circuit.

No references cited.